United States Patent [19]

Bobbio et al.

[11] Patent Number: 5,609,290

[45] Date of Patent: Mar. 11, 1997

[54] FLUXLESS SOLDERING METHOD

[75] Inventors: Stephen M. Bobbio, Wake Forest; Thomas D. DuBois; Farid M. Tranjan, Charlotte, all of N.C.; George K. Lucey, Jr., Burtonsville, Md.; James D. Geis, Cheshire, Conn.; Robert F. Lipscomb, Chapel Hill; Timothy Piekarski, Charlotte, both of N.C.

[73] Assignee: The University of North Carolina at Charlotte, Charlotte, N.C.

[21] Appl. No.: 425,864

[22] Filed: Apr. 20, 1995

[51] Int. Cl.⁶ .................................................. B23K 1/20
[52] U.S. Cl. .......................... 228/206; 228/211; 228/220
[58] Field of Search .................................. 228/203, 205, 228/206, 211, 220

[56] References Cited

U.S. PATENT DOCUMENTS

| | | | |
|---|---|---|---|
| 4,921,157 | 5/1990 | Dishon et al. | 228/220 X |
| 5,192,582 | 3/1993 | Liedke et al. | 228/206 |
| 5,244,144 | 9/1993 | Osame et al. | 228/220 X |
| 5,407,121 | 4/1995 | Koopman et al. | 228/206 |
| 5,492,265 | 2/1996 | Wandke | 228/205 |

OTHER PUBLICATIONS

Clavel et al., "Vapor Phase Fluoride–Ion Processing of Jet Engine Superalloy Components", Plating & Surface Finishing, Nov. 1991, pp. 52–57.

Koopman et al., "Fluxless Soldering in Air and Nitrogen", 43rd ECTC Proceedings, 1993 p. 595, Orlando Fl.

Koopman et al., "Fluxless Soldering for Chip–on–Board and Surface Mount", SMTA National Symposium Proceedings, Oct. 1994, p. 55 ff.

Primary Examiner—Kenneth J. Ramsey
Attorney, Agent, or Firm—Lynn E. Barber

[57] ABSTRACT

A fluxless soldering method utilizing a strongly internally bonded fluorine containing gas such as hydrogen fluoride (HF). The solder surface is exposed to the gas in place of a flux treatment, resulting in a modified surface layer which allows reflow or joining for an extended period.

33 Claims, 1 Drawing Sheet

FLUXLESS SOLDERING METHOD

BACKGROUND OF THE INVENTION

1. Field of the Invention

This invention relates to methods for fluxless soldering.

2. Description of the Related Art

Fabrication and assembly of electronic circuits requires that certain components of the circuit be in electrical contact with each other. Thus, integrated circuits (chips) or other components such as resistors, capacitors, etc., are mounted on substrates such as printed wiring boards so that the chip and substrate make electrical contact and are held together with the substrate supporting the component.

Processes for connecting the components and the substrate generally involve soldering. The first step in most current soldering processes is a pre-cleaning and deoxidation of surface oxides, generally using a liquid flux material, such as a weak organic acid applied prior to soldering and activated during the soldering process (e.g., at 230° C.) in a wave solder bath. Different flux materials are used in the pre-cleaning step to prepare the surface to be soldered by removing contaminants including metal oxides from the solder surface.

The second step in soldering involves solder reflow and/or reflow joining. This step can occur only after all oxides are removed from the solder surface because the oxides prevent the wetting of the two surfaces to be joined by the soldering reflow. When solder is heated it reflows and joins the surfaces which are in contact with solder.

The third step is post-soldering cleaning to remove the flux residue. This step is particularly difficult due to the small size of typical electronic components, and the difficulty of getting the cleaning agents to reach the minute areas between components.

Numerous investigators have attempted to eliminate the flux requirement for soldering. Fluxless soldering, or soldering without use of a liquid flux, replaces the first step with an alternate treatment, and can eliminate the third cleaning step. One example of fluxless soldering methods is the process of Dishon and Bobbio which utilizes plasma excitation using innocuous fluorinated gases, such as $SF_6$ or $CF_4$, to remove surface oxides from solder surfaces (U.S. Pat. No. 4,921,157). It is believed that these and other fluorinated gases of non-reactive substances were used as a source of plasma dissociated fluorine atoms, so that these atoms would react with and fluorinate the tin oxide ($SnO_2$) surface layer on the solder. Once this reaction occurs, the solder surface tension is sufficiently lowered so that joining is possible. In this method, the joining or reflow may be done any time within two weeks of the fluorination.

Other more recent examples of fluxless soldering include wave soldering (U.S. Pat. No. 5,044,542 of Deambrosio), palladium enhanced fluxless soldering (U.S. Pat. No. 5,048, 744 of Chang et al.), use of various inert gases (U.S. Pat. No. 5,139,193 of Todd), use of reducing agents such as lithium, calcium, strontium and cesium (U.S. Pat. No. 5,139,704 of Holland et al.), use of a laser beam (U.S. Pat. No. 5,164,566 of Spletter et al.), use of C-O-H-F (U.S. Pat. No. 5,071,486 of Chasteen), use of a heated reducing or non-reactive gas (U.S. Pat. No. 5,205,461 of Bickford et al.), and use of carbon-fluoride compositions (U.S. Pat. No. 5,380,557 of Spiro).

Unexpectedly, it has been found by the inventors herein that use of HF, having very strong internal bonds and not dissociating easily to yield free fluorine, is an efficient method of fluxless soldering and provides a surface layer on the solder which allows fluxless reflow.

In addition to using the method of the invention with solder on a surface, the method may be used for treatment of solder powder which is used in solder paste. Conventional solder paste is a composite of solder powder and a vehicle which contains solder flux where the vehicle acts as a suspending medium for the powder. Solder paste may be applied to components and circuit boards in a number of ways including screen printing. During reflow, the flux dissolves surface oxides on the powder to allow the powder particles (now liquid) to flow smoothly together and to the parts to be joined. As with other conventional soldering processes, the flux leaves a residue which should be cleaned after joining. The method of the invention also allows fluxless soldering with solder paste in which the solder powder has been pretreated using the methods described herein.

Other objects and advantages will be more fully apparent from the following disclosure and appended claims.

SUMMARY OF THE INVENTION

The method of the invention comprises utilizing a strongly internally bonded fluorine containing gas such as hydrogen fluoride (HF) to allow fluxless soldering. Hydrogen fluoride may be obtained by utilizing anhydrous HF, evaporation from aqueous HF, a chemical reaction to form HF; or an electrical discharge to form HF, where the HF is extracted from the discharge in the effluent flow, for example by glow discharge at low pressure using capacitative, inductive or microwave coupling, or high pressure discharge. The solder surface is exposed to HF in place of a flux treatment, resulting in a modified surface layer which allows reflow or joining for an extended period.

The invention method allows soldering without requiring a pre-soldering fluxing step or a post-soldering cleaning step. In particular, the method comprises (a) selecting a strongly internally bonded fluorine-containing gas; and (b) exposing solder deposited on a surface to the strongly internally bonded fluorine-containing gas, resulting in a treatment of the solder which enables the solder to be reflowed on the surface for up to two weeks. The method may be performed at a temperature of about 10°–250° C. (preferably 80°) and an exposure time of between 0.5 minute and one hour (preferably 1.5 minute). The higher temperature allows for in-situ reflow treatment.

The method is preferably used with tin lead solder applied to a surface of tin lead solder, tin plated parts, copper parts or gold plated parts. The method may be used to allow two parts to be joined together or to prepare one of two parts to be joined by soldering.

Another application of the method is the treatment of solder powder which is used in solder paste.

Other aspects and features of the invention will be more fully apparent from the following disclosure and appended claims.

DETAILED DESCRIPTION OF THE INVENTION AND PREFERRED EMBODIMENTS THEREOF

Figure 1:
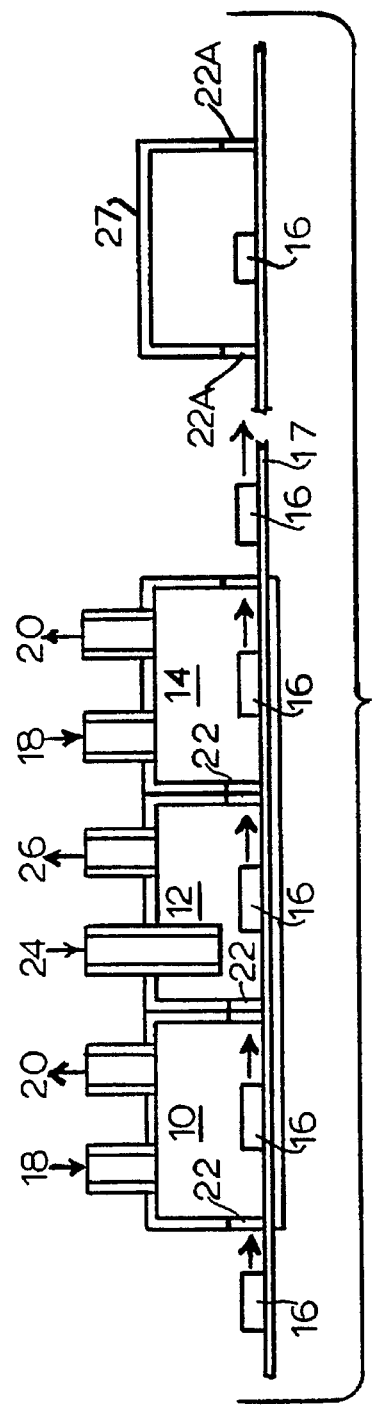
FIG. 1 is a schematic drawing of a manufacturing version of an apparatus which may be used for performing the preferred embodiment of the invention.

The present invention utilizes strongly internally bonded fluorine-containing gases such as HF to provide a surface for fluxless soldering of electronic components. The method of the invention may be used for solder or solderable metal (e.g., tin or copper) on a surface and for treatment of solder powder which is used in solder paste.

Solder, including also solder preform or solder already coated on a surface, or solderable metal on a surface is exposed to the strongly internally bonded fluorine-containing gas, which is not thermally dissociated, to form a surface layer in which the fluorine is bound, and which allows soldering to occur as if the surface had been pre-cleaned with a fluxing step with the important additional advantage that a post-soldering removal step is not required.

The method of the invention does not produce volatile metal fluorides at any of the temperatures involved in the soldering process, and is not a cleaning process per se. It is believed that in the method of the invention, the metal oxide, instead of being removed directly, is chemically modified so that there is an HF/metal oxide layer which remains for up to two weeks. It may be that HF diffuses into the area to be soldered and forms hydrogen bonds with the tin oxide or tin oxyhydroxide in the surface layer. As the temperature is raised in the solder reflow process, the HF becomes more mobile in the surface film and diffuses to the tin/tin oxide interface where it reacts with the non-oxygen-bonded tin centers resulting in a microscopic release of hydrogen. This occurs along the interface between the Sn-oxide skin, which is about 20 Angstroms thick, and the metal and effectively detaches the oxide layer. When viewed microscopically during reflow, the skin, which is no longer chemically joined to the molten metal beneath, can be seen to be breaking into little pieces.

HF can be utilized directly as a pure anhydrous gas or in an inert carrier such as argon or nitrogen. Alternatively, HF may be obtained from other fluorinated compounds by conventional chemical reaction, for example, the reaction between calcium fluoride and sulfuric acid produces HF according to:

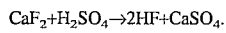

$$CaF_2 + H_2SO_4 \rightarrow 2HF + CaSO_4.$$

Although some of the HF is dissolved in the aqueous reaction medium, some evolves as a gas and may be used for the solder treatment.

A second type of chemical reaction which may be used involves the use of an electrical discharge (such as a plasma or glow discharge). As discussed in more detail below, electrical discharge may be obtained by any of the well-known methods in the art of plasma technology practice. For example, the electrical discharge may be obtained by glow discharge at low pressure where the discharge is produced by either an inductively coupled electrical generator; a capacitively coupled electrical generator; or a microwave generator. Alternatively, the electrical discharge may be obtained by high pressure discharge produced by a corona discharge electrode; spark-gap electrodes; a gas filled plasma coupled electrode; an inductively coupled electrical generator; or a focussed microwave generator.

The use of electrical discharge has the advantage of being able to use very inert starting materials (such as $SF_6$ and water vapor) and eliminate the safety concerns of storage of reactive materials. If a plasma discharge is used to produce HF, the solder-coated parts to be treated should not be directly exposed to the discharge but placed in the effluent or exhaust region downstream of the plasma so as to avoid electrical damage.

The preferred method of the invention does not require use of a full vacuum and can actually be performed at slightly greater than atmospheric pressure if proper steps are taken to ensure safe removal of exhaust gases. Preferably, the method of the invention is performed at a pressure slightly less than atmospheric pressure so that any leakage will be into the system, and exhaust gases will not be released from the system.

The invention also does not require typical high soldering temperatures for the pre-solder treatment with HF. Thus, the HF treatment may be performed at a temperature of about 10°–250° C., although about 80° C. is preferred.

Alternatively, if it is desired to use an electrical discharge to generate HF, the treatment system is more complex. A glow discharge process might be configured as is known in the art, for example, that described in Koopman et al., (Fluxless Soldering in Air and Nitrogen, 43rd ECTC Proceedings, 1993, page 595, Orlando, Fla.; and Fluxless Soldering for Chip-on-Board and Surface Mount, SMTA National Symposium Proceedings, October, 1994, page 55), the disclosures of which are incorporated herein by reference. The pressure may be between 5 mTorr and 20 Torr, more preferably is between about 350 mTorr and 800 mTorr, and most preferably is about 350 mTorr. The gas mixture preferably contains a fluorine source gas (such as $SF_6$, $NF_3$, $CF_4$, $C_2F_6$, or $BF_3$) together with a hydrogen source gas (such as water vapor or $H_2$). Alternatively, a source gas which contains both hydrogen and fluorine may be used (for example, $CHF_3$).

A second type of electrical discharge may also be used at or near atmospheric pressure to produce HF. In this case, the discharge may be a corona or spark discharge where the electrical means consists of an electrically biased wire or sharp point to generate the high electric field required for the corona or a gap with high electric field across it required for the spark. Alternatively, gas filled plasma coupled electrodes, inductively coupled systems, or focussed microwaves are suitable sources for generating the high pressure discharge. The gases used for the high pressure discharge would be effectively the same as those used for the glow discharge. If electrical methods are used to generate HF, the treated parts can be placed downstream in the effluent or exhaust region (or otherwise shielded from the discharge itself), where they are exposed to HF, but not to any direct electrical effect which might produce damage.

A manufacturing version of the apparatus for performing the preferred embodiment of the invention, shown schematically in FIG. 1, includes preferably three chambers 10,12,14 arranged so that the items 16 to be soldered, such as circuit boards, move in sequence through the chambers by means of a conveying system 17. The first chamber 10 and third chamber 14 contain a gas inlet 18 and exhaust outlet 20 through which a suitable safe gas is passed (e.g., dry air, nitrogen or argon). A safe gas curtain 22, as is known in the art, forms a barrier across the chamber openings through which the circuit boards move. The purpose of these chambers is to isolate the second or middle chamber 12 from the outside world. The fluxless soldering treatment is performed in the second chamber 12 which contains a gas inlet 24 and exhaust outlet 26 for the process gas which may be pure anhydrous HF, or HF in a carrier gas, such as argon or nitrogen. The middle chamber 12 should be heated to the preferred temperature, e.g., 80°. Alternatively, for enhanced isolation of the process, the first and third chambers may be configured as evacuable, or partially evacuable, load locks. Moreover, recirculating means may be used in the second chamber to minimize the amount of hazardous effluent. In all cases, exhaust gases containing HF should be scrubbed (e.g., reacted with $Ca(OH)_2$(aq.) to produce $H_2O$ and $CaF_2$ as a precipitate).

The method of the invention may be performed in a stand-alone apparatus, with reflow being performed later or in a different location by means known in the art. Alternatively, the method may be performed in an in-line system together with a reflow system (shown as optional chamber 27 in FIG. 1), such as solder wave reflow, or an $N_2$ or air belt furnace having its own entrance and exit 22A (FIG. 1), which in many cases are simply openings to the atmosphere. A third alternative for performing the method of the invention is in-situ treatment in which HF is provided in the reflow system, such as an HF belt furnace so that both the HF treatment and the solder reflow or joining occur in the same chamber.

For treatment of solder powder used in solder paste with the method of the invention, the solder powder may be pretreated in a strongly internally bonded fluorine-containing gas, such as HF, and incorporated in a neutral vehicle which does not contain flux but which is chosen to evaporate cleanly during reflow (leaving no residue) or to leave easily cleaned residues, and which does not interact with the fluorinated tin oxide surface on the powder in any deleterious way which obviates the pretreatment.

The features and advantages of the present invention will be more clearly understood by reference to the following example, which is not to be construed as limiting the invention.

EXAMPLE I

Figure 2:
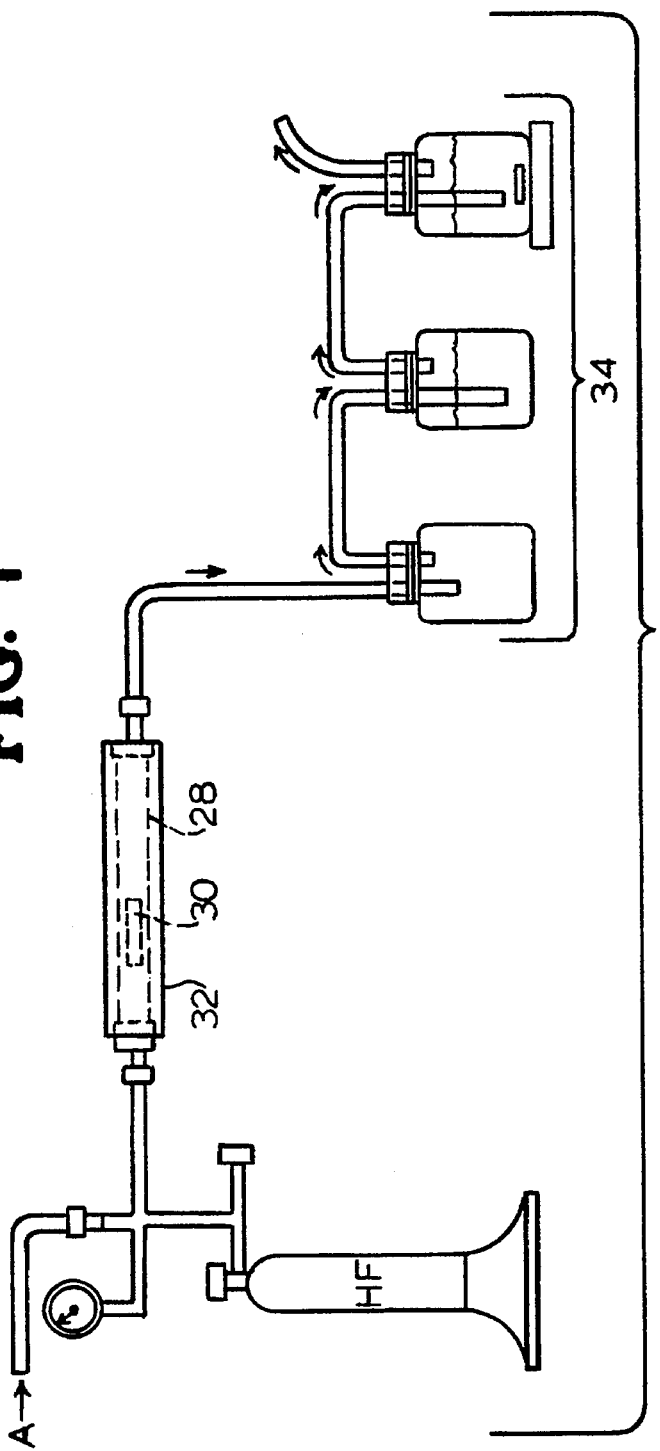
FIG. 2 is a schematic drawing showing the apparatus used for the invention in Example I.

The apparatus first used to establish that the invention provides a method of fluxless soldering which is extremely straightforward and is shown in FIG. 2. It consists of an alumina ($Al_2O_3$) tube 28 into which the parts 30 to be treated are placed. Either argon or anhydrous HF may be flowed into the tube (and over the parts). The tube may be heated to 80° C. by use of a heating mantle 32 which is wrapped around it. Temperature is measured with a thermocouple attached to the $Al_2O_3$ tube and thermocouple readout (not shown). The apparatus is provided with a primitive exhaust scrubber 34 having three chambers. The first chamber is empty to prevent fluid back-streaming, the second chamber contains mineral oil to prevent water contamination and the third chamber placed on a magnetic stirrer contains $Ca(OH)_2$(aq) and a magnetic stirring bar to convert HF to $CaF_2$ and water. During the experiments, argon A was flowed for about 10 minutes to purge the system of any air. The argon was then valved-off and HF was flowed at about 30 sccm (standard cubic centimeters per minute) for a time which ranged from 1.5 minutes to 30 minutes (depending on the particular experiment). The HF was then valved-off and argon was again flowed to purge any residual HF. The heating mantle was removed, the $Al_2O_3$ tube was disassembled from the rest of the apparatus, the treated parts were removed from the tube and reflowed in air on a conventional hot plate.

In the method of the invention the surface upon which the solder is reflowed may be solder precoated on a surface, tin, copper or gold, which includes surfaces plated with these substances.

When the substance to be soldered and which is exposed to the gas is treated or untreated solder precoated on a surface, solder preform, solder in a powder form which will be incorporated in a solder paste at a future time, or molten solder as in a solder wave machine, the surface may be solder precoated on a surface, tin, copper, or gold, which has been treated with said strongly internally bonded fluorine-containing gas; or solder precoated on a surface, tin, copper, and gold, which has not been treated with said strongly internally bonded fluorine-containing gas.

When the solder is untreated solder precoated on a surface, untreated solder preform, untreated solder in a powder form which has been incorporated in a solder paste, or molten solder as in a solder wave machine, the surface may be solder precoated on a surface, tin, copper, or gold, which has been treated with said strongly internally bonded fluorine-containing gas.

Finally, the preceding description has been directed to the complete elimination of flux and flux cleaning in the soldering process. The methods described above may also be used to improve the reliability of processes which use mild or weakly activated flux. Such fluxes may require only very mild cleaning or no cleaning at all. As examples, the flux residue may be noncorrosive so that it may be formulated to evaporate during the reflow so that it leaves no residue. In this embodiment of the invention, HF treatment must be done as a pretreatment prior to flux addition. Any of the same substances to be soldered may be used as described with the other embodiments of the invention so long as they can be treated with the gas before flux is added and the same surfaces on which the solder is to be later reflowed are appropriate.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A fluxless soldering method, comprising:
   (a) selecting a strongly internally bonded fluorine-containing gas; and
   (b) exposing a substance to be soldered to the strongly internally bonded fluorine-containing gas at a temperature of about 10°–250° C., wherein said method results in a treatment of said substance which enables solder to be reflowed on a surface at a later time, wherein the surface is selected from the group consisting of solder precoated on a surface, tin, copper and gold.

2. The method of claim 1, wherein the substance is solder when it is exposed to the strongly bonded fluorine-containing gas.

3. The method of claim 2, wherein the substance is solder precoated on a surface.

4. The method of claim 2, wherein the substance is a solder preform.

5. The method of claim 1, wherein the substance is a solder in a powder form.

6. The method of claim 1, wherein the substance is a molten solder.

7. A fluxless soldering method, comprising:
   (a) selecting a strongly internally bonded fluorine-containing gas; and
   (b) exposing a substance to be soldered to the strongly internally bonded fluorine-containing gas, wherein said method results in a treatment of said substance which enables solder to be reflowed on a surface at a later time, wherein said substance is selected from the group consisting of solder precoated on a surface, solder preform, solder in a powder form which will be incorporated in a solder paste at a future time, and molten solder and said surface is selected from the group consisting of:
  (a) solder precoated on a surface, tin, copper, and gold, which have been treated with said strongly internally bonded fluorine-containing gas; and
  (b) solder precoated on a surface, tin, copper, and gold, which have not been treated with said strongly internally bonded fluorine-containing gas.

8. A fluxless soldering method, comprising:
  (a) selecting a strongly internally bonded fluorine-containing gas; and
  (b) exposing a substance to be soldered to the strongly internally bonded fluorine-containing gas, wherein said method results in a treatment of said substance which enables solder to be reflowed on a surface at a later time, wherein said solder is selected from the group consisting of untreated solder precoated on a surface, untreated solder preform, untreated solder in a powder form which has been incorporated in a solder paste, and molten solder, and said surface is selected from the group consisting of solder precoated on a surface, tin, copper, and gold, which have been treated with said strongly internally bonded fluorine-containing gas.

9. The method of claim 1, wherein the strongly internally bonded fluorine-containing gas is hydrogen fluoride.

10. The method of claim 9, further comprising obtaining said hydrogen fluoride by a method selected from the group consisting of:
  (a) utilizing anhydrous HF;
  (b) evaporation from aqueous HF;
  (c) utilizing a chemical reaction to form HF; and
  (d) utilizing electrical discharge to form HF, where the HF is extracted from the discharge in the effluent flow.

11. The method of claim 10, wherein hydrogen fluoride is obtained by utilizing electrical discharge to form HF in an effluent, said electrical discharge being obtained by a method selected from the group consisting of:
  (a) glow discharge at low pressure where the discharge is produced by a component selected from the group consisting of:
    (i) an inductively coupled electrical generator;
    (ii) a capacitively coupled electrical generator; and
    (iii) a microwave generator;
  (b) high pressure discharge where the discharge is produced by a component selected from the group consisting of:
    (i) a corona discharge electrode;
    (ii) spark-gap electrodes;
    (iii) a gas filled plasma coupled electrode;
    (iv) an inductively coupled electrical generator; and
    (v) a focussed microwave generator.

12. The method of claim 1, wherein the method is performed at or near ambient atmospheric pressure.

13. The method of claim 12, wherein the method is performed at a pressure lower than ambient atmospheric pressure.

14. The method of claim 1, wherein the method is performed in an evacuated chamber at low pressure in the range where glow discharge can occur.

15. The method of claim 1, wherein the method is performed at an exposure time of between 0.5 minute and one hour.

16. The method according to claim 15, wherein the temperature is 80° C. and the exposure time is 1.5 minute.

17. The method according to claim 1, wherein said substance is tin lead solder.

18. A method of improving soldering processes employing flux, comprising:
  (a) selecting a strongly internally bonded fluorine-containing gas; and
  (b) exposing a substance to be soldered to the strongly internally bonded fluorine-containing gas at a temperature of about 10°–250° C., wherein said method results in a treatment of said substance which enables solder to be reflowed on a surface at a later time, wherein the surface is selected from the group consisting of solder precoated on a surface, tin, copper and gold.

19. The method of claim 18, wherein the substance is solder when it is exposed to the strongly bonded fluorine-containing gas.

20. The method of claim 19, wherein the substance is solder precoated on a surface.

21. The method of claim 19, wherein the substance is a solder preform.

22. The method of claim 18, wherein the substance is a solder in a powder form.

23. A method of improving soldering processes employing flux, comprising:
  (a) selecting a strongly internally bonded fluorine-containing gas: and
  (b) exposing a substance to be soldered to the strongly internally bonded fluorine-containing gas, wherein said method results in a treatment of said substance which enables solder to be reflowed on a surface at a later time, wherein said substance is selected from the group consisting of solder precoated on a surface, solder preform, and solder in a powder form which will be incorporated in a solder paste at a future time, and said surface is selected from the group consisting of:
    (a) solder precoated on a surface, tin, copper, and gold, which have been treated with said strongly internally bonded fluorine-containing gas; and
    (b) solder precoated on a surface, tin, copper, and gold, which have not been treated with said strongly internally bonded fluorine-containing gas.

24. A method of improving soldering processes employing flux, comprising:
  (a) selecting a strongly internally bonded fluorine-containing gas; and
  (b) exposing a substance to be soldered to the strongly internally bonded fluorine-containing gas, wherein said method results in a treatment of said substance which enables solder to be reflowed on a surface at a later time, wherein said solder is selected from the group consisting untreated solder precoated on a surface, untreated solder preform, untreated solder in a powder form which has been incorporated in a solder paste, and molten solder, and said surface is selected from the group consisting of solder precoated on a surface, tin, copper and gold, which have been treated with said strongly internally bonded fluorine-containing gas.

25. The method of claim 18, wherein the strongly internally bonded fluorine-containing gas is hydrogen fluoride.

26. The method of claim 25, further comprising obtaining said hydrogen fluoride by a method selected from the group consisting of:
  (a) utilizing anhydrous HF;
  (b) evaporation from aqueous HF;
  (c) utilizing a chemical reaction to form HF; and
  (d) utilizing electrical discharge to form HF, where the HF is extracted from the discharge in the effluent flow.

27. The method of claim 26, wherein hydrogen fluoride is obtained by utilizing electrical discharge to form HF in an effluent, said electrical discharge being obtained by a method selected from the group consisting of:
  (a) glow discharge at low pressure where the discharge is produced by a component selected from the group consisting of:
    (i) an inductively coupled electrical generator;
    (ii) a capacitively coupled electrical generator; and
    (iii) a microwave generator;
  (b) high pressure discharge where the discharge is produced by a component selected from the group consisting of:
    (i) a corona discharge electrode;
    (ii) spark-gap electrodes;
    (iii) a gas filled plasma coupled electrode;
    (iv) an inductively coupled electrical generator; and
    (v) a focussed microwave generator.

28. The method of claim 18, wherein the method is performed at or near ambient atmospheric pressure.

29. The method of claim 28, wherein the method is performed at a pressure lower than ambient atmospheric pressure.

30. The method of claim 18, wherein the method is performed in an evacuated chamber at low pressure in the range where glow discharge can occur.

31. The method of claim 18, wherein the method is performed at an exposure time of between 0.5 minute and one hour.

32. The method according to claim 31, wherein the temperature is 80° C. and the exposure time is 1.5 minute.

33. The method according to claim 18, wherein said substance is tin lead solder.

* * * * *